United States Patent
Koo

(10) Patent No.: US 8,005,004 B2
(45) Date of Patent: Aug. 23, 2011

(54) METHOD OF REQUESTING AND REPORTING LINK QUALITY IN AN EGPRS2 SYSTEM

(75) Inventor: Hyounhee Koo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 12/318,812

(22) Filed: Jan. 8, 2009

(65) Prior Publication Data

US 2009/0175184 A1 Jul. 9, 2009

(30) Foreign Application Priority Data

Jan. 9, 2008 (KR) .................. 10-2008-0002625
Feb. 12, 2008 (KR) .................. 10-2008-0012424
Jul. 29, 2008 (KR) .................. 10-2008-0073911

(51) Int. Cl.
*G01R 31/08* (2006.01)
(52) U.S. Cl. .................... 370/252; 370/336; 370/337
(58) Field of Classification Search .................. None
See application file for complete search history.

(56) References Cited

U.S. PATENT DOCUMENTS

| 6,717,934 | B1 * | 4/2004 | Kaasila et al. | 370/347 |
|---|---|---|---|---|
| 7,089,015 | B2 | 8/2006 | Fukui | |
| 7,315,966 | B2 * | 1/2008 | Niemela | 714/704 |
| 7,729,272 | B2 * | 6/2010 | Avivi | 370/252 |
| 2003/0016641 | A1 | 1/2003 | Terry et al. | |
| 2004/0184426 | A1 * | 9/2004 | Tan | 370/338 |
| 2004/0252647 | A1 * | 12/2004 | Chang et al. | 370/252 |
| 2005/0201499 | A1 | 9/2005 | Jonsson | |
| 2008/0165696 | A1 * | 7/2008 | Koo | 370/252 |
| 2009/0073940 | A1 * | 3/2009 | Shrivastava et al. | 370/336 |
| 2009/0175227 | A1 * | 7/2009 | Hyounhee | 370/329 |
| 2009/0175246 | A1 * | 7/2009 | Koo | 370/336 |

* cited by examiner

*Primary Examiner* — Chi Pham
*Assistant Examiner* — Kouroush Mohebbi
(74) *Attorney, Agent, or Firm* — McKenna Long & Aldridge, LLP

(57) ABSTRACT

The link quality reporting method includes measuring link quality for received radio blocks, and if there is a modulation scheme with a largest number of radio blocks, reporting link quality for the modulation scheme, and if there is a plurality of schemes with the same number of radio blocks, reporting link quality for a modulation scheme selected using a predetermined method. Performance deterioration can be minimized in a link adaptation process.

6 Claims, 7 Drawing Sheets

METHOD OF REQUESTING AND REPORTING LINK QUALITY IN AN EGPRS2 SYSTEM

CROSS-REFERENCE TO RELATED APPLICATIONS

This application claims the benefit of priority of Korean Patent Application No. 10-2008-0002625 filed on Jan. 9, 2008, Korean Patent Application No. 10-2008-0012424 filed on Feb. 12, 2008, and Korean Patent Application No. 10-2008-0073911 filed on Jul. 29, 2008, which are incorporated by reference in their entirety herein.

BACKGROUND

1. Technical Field

The present invention relates to wireless communications, and more particularly, to a method of reporting link quality for radio blocks using various modulation schemes in an enhanced general packet radio service system (EGPRS) or an enhanced general packet radio service phase 2 (EGPRS2) system and to a method of requesting uplink radio resources from a mobile station to a base station.

2. Related Art

Global system for mobile communication (GSM) is a radio technology which has been developed as a standardized system for radio communication systems in Europe and which has widely been deployed all over the world. General packet radio service (GPRS) was introduced to provide packet switched data services in circuit switched data services provided by the GSM. The enhanced data rate for GSM evolution (EDGE) employs an 8-phase shift keying (PSK) in addition to the Gaussian minimum shift keying (GMSK) employed in the GSM. The enhanced general packet radio-service (EGPRS) represents the GPRS using the EDGE.

A packet data channel (PDCH) denotes a physical channel used for GPRS/EGPRS traffic. Examples of logical channels mapped onto the PDCH include a packet common control channel (PCCCH) used for control signals required in packet transmission initialization, a packet data traffic channel (PDTCH) for user data, a packet associated control channel (PACCH) for dedicated signalling, and so on.

An enhanced general packet radio service phase 2 (EGPRS2) supporting further various modulation and coding schemes has recently being developed. While the EGPRS supports only two modulation schemes (i.e., GMSK and 8-PSK), the EGPRS2 supports five modulation schemes (i.e., GMSK, quadrature phase shift keying (QPSK), 8-PSK, 16-quadrature amplitude modulation (QAM), and 32-QAM). There are two levels of EGPRS2, that is, EGPRS2-A and EGPRS2-B. The EGPRS2-A supports the GMSK, 8-PSK, 16-QAM, and 32-QAM. The EGPRS2-B supports the GMSK, QPSK, 16-QAM, and 32-QAM. A downlink EGPRS2-A uses modulation schemes MCS-1 to MCS-4 (MCS stands for Modulation and Coding Scheme) and DAS-5 to DAS-12 (DAS stands for Downlink level A modulation and coding Scheme). An uplink EGPRS2-A uses modulation schemes MCS-1 to MCS-6 and UAS-7 to UAS-11 (UAS stands for Uplink level A modulation and coding Scheme). A downlink EGPRS2-B uses modulation schemes MCS-1 to MCS-4 and DBS-5 to DBS-12 (DBS stands for Downlink level B modulation and coding Scheme). An uplink EGPRS2-B uses modulation schemes MCS-1 to MCS-4 and UBS-5 to UBS-12 (UBS stands for Uplink level B modulation and coding Scheme). A modulation and coding scheme for each level in the EGPRS2 may be found in clause 6.5.5.1.3 of 3GPP TS 43.064 V7.6.0 (2007-08) "Technical Specification; GSM/EDGE Radio Access Network; General Packet Radio Service (GPRS); Overall description of the GPRS radio interface; Stage 2 (Release 7)".

An EGPRS/EGPRS2 system provides a multi-data rate by using various modulation and coding schemes. For example, data is transmitted with various data rates through the PDTCH. The data rate is regulated on the basis of the link quality in a link adaptation process. If the link quality is good, data is transmitted with a high data rate. On the contrary, if the link quality is poor, data is transmitted with a low data rate. Data may be lost when transmitted according to a modulation and coding scheme that requires a data rate higher than achievable with the link quality. In link adaptation, a data throughput is increased using the highest possible data rate by using a specific modulation and coding scheme with a predetermined link quality.

For the link adaptation process, the link quality needs to be reported from a mobile station (MS) to a base station (BS). In order for the MS to transmit packet data to a network, uplink radio resources have to be assigned. As described above, the EGPRS2 supports additional modulation schemes, and the MS supports the two EGPRS2 levels (i.e., EGPRS2-A and EGPRS2-B).

In the EGPRS/EGPRS2 system, the link quality between the base station and the mobile station is represented with a bit error probability (BEP). The BEP is an expectation value of the actual bit error rate (BER) of a signal received by the mobile station through a radio channel. The BEP is measured burst by burst. The base station selects a suitable modulation and coding scheme according to the reported link quality.

The link adaptation can be performed in a most effective manner when the reported BEP most accurately estimates the actual BER. With the use of additional modulation schemes in the EGPRS2, there is a need for a method of effectively reporting link quality according to the various modulation schemes.

SUMMARY

The present invention provides a method of reporting link quality for some of a plurality of modulation schemes in an enhanced general packet radio service phase 2 (EGPRS2) system using the plurality of modulation schemes.

The present invention also provides a method of reporting link quality to improve performance of a link adaptation process in an enhanced general packet radio service phase 2 (EGPRS2) system using a plurality of modulation schemes.

The present invention also provides a method of requesting uplink radio resources in an enhanced general packet radio service phase 2 (EGPRS2) system.

According to an aspect of the invention, the mobile terminal reports link quality for radio blocks using a plurality of modulation schemes by determining a link quality parameter for each modulation scheme and each timeslot assigned to the mobile terminal, determining the number of times each modulation scheme is used in each of the assigned timeslots over a reporting period, selecting a modulation scheme per timeslot and reporting to a network, for each assigned timeslot, the selected modulation scheme and the corresponding link quality parameter.

The invention also relates to a corresponding mobile terminal comprising a radio frequency (RF) unit adapted to receive radio blocks using a plurality of modulation schemes and a processor coupled with the RF unit and adapted for determining a link quality parameter for each modulation scheme and each timeslot assigned to the mobile terminal, determining the number of times each modulation scheme is used in each of the assigned timeslots over a reporting period, selecting a modulation scheme per timeslot and reporting to a network, for each assigned timeslot, the selected modulation scheme and the corresponding link quality parameter.

Advantageously, the selected modulation scheme is the most used modulation scheme per timeslot over the reporting period.

In a specific embodiment the selected modulation scheme is the modulation scheme with which the mobile terminal has received the largest number of radio blocks per timeslot over the reporting period.

In one embodiment, determining the link quality parameter comprises measuring a bit error probability (BEP) per burst, averaging the measured BEP per radio block and computing the link quality parameter based on the measured and averaged BEP per modulation scheme and per time slot.

In one case the plurality of modulation schemes comprises Gaussian minimum shift keying (GMSK), quadrature phase shift keying (QPSK), 8-phase shift keying (PSK), 16-quadrature amplitude modulation (QAM), and 32-QAM.

Alternatively, the plurality of modulation schemes comprises GMSK, QPSK, 8-PSK, 16-QAM normal symbol rate (NSR), 16-QAM higher symbol rate (HSR), 32-QAM NSR, and 32-QAM HSR.

The invention also relates to a method of reporting link quality for radio blocks using a plurality of modulation schemes, the method comprising, performed in a mobile terminal, determining a link quality parameter for each modulation scheme and each timeslot assigned to the mobile terminal, determining the number of times each modulation scheme is used in each of the assigned timeslots over a reporting period, selecting at least one modulation scheme and reporting link quality information for said selected modulation scheme to a network. In this method selecting comprises selecting the most used modulation scheme and if there are several mostly used modulation schemes, selecting one modulation scheme among said mostly used modulations schemes based on its modulation order or its error rate.

Similarly, the invention relates to a mobile terminal comprising a radio frequency (RF) unit adapted to receive radio blocks using a plurality of modulation schemes and a processor coupled with the RF unit and adapted for determining a link quality parameter for each modulation scheme and each timeslot assigned to the mobile terminal determining the number of times each modulation scheme is used in each of the assigned timeslots over a reporting period, selecting at least one modulation scheme and reporting link quality information for said selected modulation scheme to a network. In this mobile terminal selecting comprises selecting the most used modulation scheme and if there are several mostly used modulation schemes, selecting one modulation scheme among said mostly used modulations schemes based on its modulation order or its error rate.

Advantageously, the invention further comprises selecting another modulation scheme, wherein said other modulation is the most used modulation scheme among not selected modulation schemes and if there are several not selected mostly used modulation schemes, selecting one modulation scheme among said not selected mostly used modulation schemes based on its modulation order or its error rate.

In one embodiment, selecting one modulation scheme among said mostly used modulations schemes or said not selected mostly used modulation schemes comprises selecting a high-order modulation scheme.

Alternatively, selecting one modulation scheme among said mostly used modulations schemes or said not selected mostly used modulation schemes comprises selecting a low-order modulation scheme.

In another alternative selecting one modulation scheme among said mostly used modulations schemes or said not selected mostly used modulation schemes comprises selecting a modulation scheme with a low mean bit error probability (BEP).

In another alternative wherein selecting one modulation scheme among said mostly used modulations schemes or said not selected mostly used modulation schemes comprises selecting a modulation scheme with a high mean BEP.

In one embodiment, said link quality information comprises the link quality parameter for each selected modulation scheme for each timeslot.

Alternatively, said link quality information comprises an averaged value of the link quality parameters of each selected modulation scheme over several assigned timeslots.

In one embodiment, determining the link quality parameter comprises measuring a bit error probability (BEP) per burst, averaging the measured BEP per radio block and computing the link quality parameter based on the measured and averaged BEP per modulation scheme and per time slot.

Furthermore, the invention also relates to a method of reporting link quality for radio blocks using a plurality of modulation schemes, the method comprising, performed in a mobile terminal: determining a link quality parameter for each modulation scheme and each timeslot assigned to the mobile terminal, determining the number of times each modulation scheme is used in the assigned timeslots over a reporting period, selecting at least one modulation scheme and reporting to a network the selected modulation scheme and corresponding link quality information. In this method, selecting comprises: determining a subset of modulation schemes among a set of available modulation schemes and selecting modulation schemes among the sole modulation schemes of said subset.

The invention also relates to a corresponding mobile terminal comprising a radio frequency (RF) unit adapted to receive radio blocks using a plurality of modulation schemes and a processor coupled with the RF unit and adapted for: determining a link quality parameter for each modulation scheme and each timeslot assigned to the mobile terminal, determining the number of times each modulation scheme is used in the assigned timeslots over a reporting period, selecting at least one modulation scheme and reporting to a network the selected modulation scheme and corresponding link quality information. In this mobile terminal, selecting comprises: determining a subset of modulation schemes among a set of available modulation schemes and selecting modulation schemes among the sole modulation schemes of said subset.

In one embodiment, the set of available modulation schemes comprises seven modulations schemes and the subset comprises four modulation schemes.

Advantageously, the plurality of available modulation schemes comprise GMSK, QPSK, 8-PSK, 16-QAM normal symbol rate (NSR), 16-QAM higher symbol rate (HSR), 32-QAM NSR, and 32-QAM HSR.

In one embodiment, selecting a modulation scheme comprises selecting the modulation scheme which is the most used in one timeslot and among the modulation schemes of the subset.

Advantageously, said link quality information comprises the link quality parameter for each selected modulation scheme for each timeslot.

Alternatively, said link quality information comprises an averaged value of the link quality parameters of each selected modulation scheme over several assigned timeslots.

In one embodiment, determining the link quality parameter comprises: measuring a bit error probability (BEP) per burst, averaging the measured BEP per radio block and computing the link quality parameter based on the measured and averaged BEP per modulation scheme and per time slot.

DESCRIPTION OF EXEMPLARY EMBODIMENTS

Figure 1:
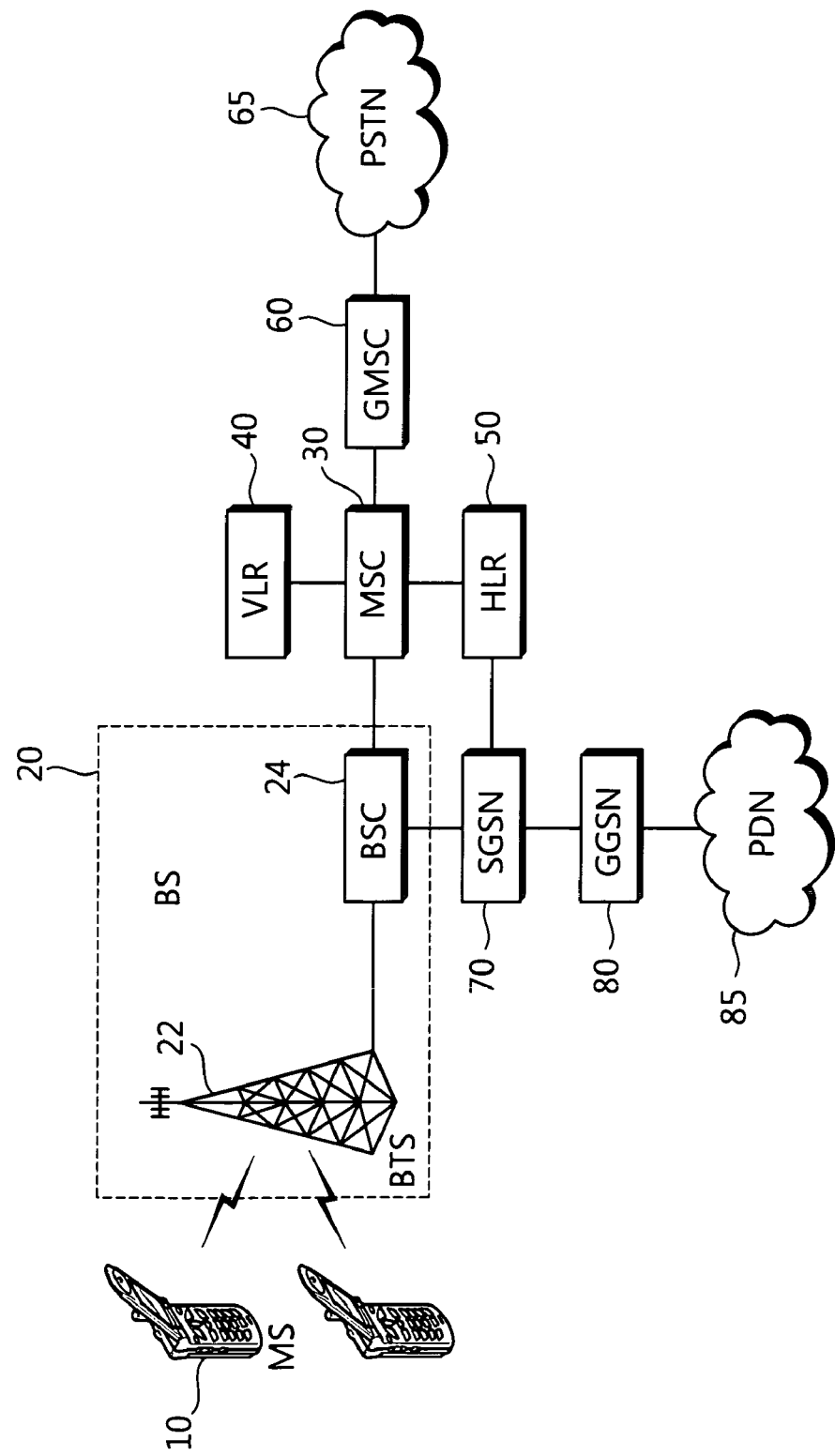
FIG. 1 is a block diagram illustrating a wireless communication system.

FIG. 1 is a block diagram illustrating a wireless communication system. This example shows a network based on an enhanced general packet radio service phase 2 (EGPRS2). Wireless communication systems are widely used to provide a variety of communication services of voice, packet data, and so on.

Referring to FIG. 1, a mobile station (MS) 10 is a communication instrument carried by a user and may be called using other terms such as user equipment (UE), a user terminal (UT), and a subscriber station (SS), a wireless device, etc.

The communication system also comprises a base station (BS) 20 which includes a base transceiver station (BTS) 22 and a base station controller (BSC) 24. The BTS 22 communicates with the MS 10 in a cellular area through a radio interface and performs a synchronization function with the MS 10. The BSC 24 interfaces at least one BTS 22 with a mobile switching center (MSC) 30. The BS 20 may be called a base station subsystem, a Node-B, or an access point.

The MSC 30 connects the BS 20 to a different kind of network such as a public switching telephone network (PSTN) 65 or a public land mobile network (PLMN) through a gateway MSC (GMSC) 60. A visitor location register (VLR) 40 stores temporary user data, which includes information on the roaming of all the MSs 10 in the service area of the MSC 30. A home location register (HLR) 50 includes information on all the subscribers in the home network. A serving GPRS support node (SGSN) 70 takes in charge the management of the mobility of the subscribers. A gateway GPRS data network (GGSN) 80 routes a packet at the current position of the MS 10 to interface the MS with an external packet data network such as a public data network (PDN) 85.

A temporary block flow (TBF) is a logical connection offered by two medium access control (MAC) entities so as to support the unidirectional transfer of a radio link control (RLC) protocol data unit (PDU) on basic physical subchannels. The TBF is not provided in a packet idle mode. At least one TBF is provided in a packet transfer mode. In the packet transfer mode, radio resources on one or more packet data physical channels for the transfer of packet data are assigned to the MS. MAC-idle state means a MAC-control-entity state where no basic physical subchannel is assigned. A temporary flow identity (TFI) is assigned to each TBF by the network. The MS assumes that the TFI value is unique among concurrent TBFs in the same direction (uplink or downlink) on all packet data channels (PDCHs) used for the TBFs. The same TFI value may be used concurrently for TBFs on other PDCHs in the same direction and for TBFs in the opposite direction.

A TBF for the GPRS is referred to as a GPRS TBF. A TBF for the EGPRS is referred to as an EGPRS TBF. A TBF for the EGPRS2 is referred to as an EGPRS2 TBF. A TBF for the EGPRS2-A is referred to as an EGPRS2-A TBF. A TBF for the EGPRS2-B is referred to as an EGPRS2-B TBF.

Figure 2:
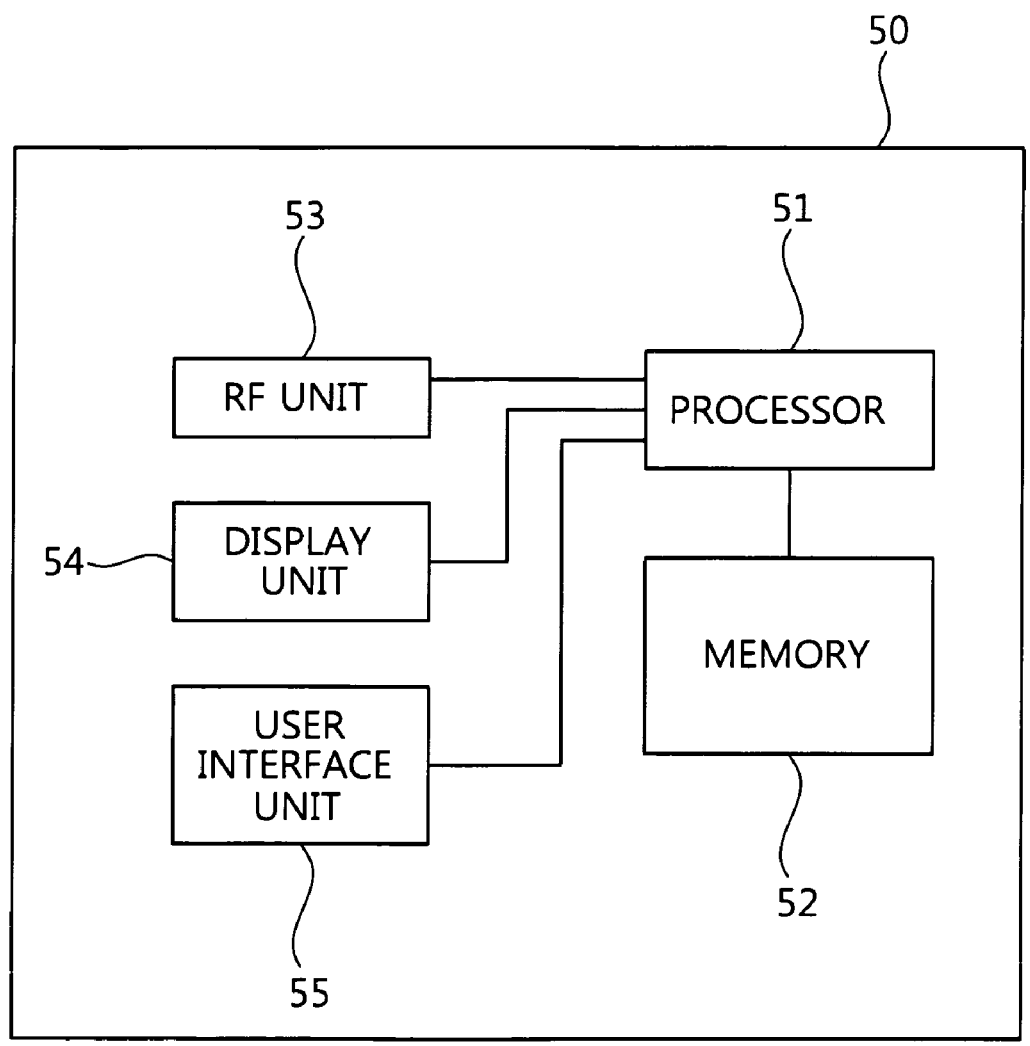
FIG. 2 is a block diagram illustrating constitutional elements of a mobile station.

FIG. 2 is a block diagram illustrating constitutional elements of an MS. An MS 50 includes a processor 51, a memory 52, a radio frequency (RF) unit 53, a display unit 54, and a user interface unit 55. The memory 52 is coupled to the processor 51 and stores an MS operating system, applications, and general files. The display unit 54 displays a variety of information of the MS 50 and may use well-known elements such as liquid crystal display (LCD), organic light emitting diode (OLED) display, etc. The user interface unit 55 can be configured with a combination of well-known user interfaces such as keypad, touch screen, etc. The RF unit 53 is coupled to the processor 51 and transmits and/or receives radio signals.

The processor 51 measures and reports link quality for radio blocks received through the RF unit 53. Further, the processor 51 requests the network to assign radio resources for uplink transmission.

Figure 3:
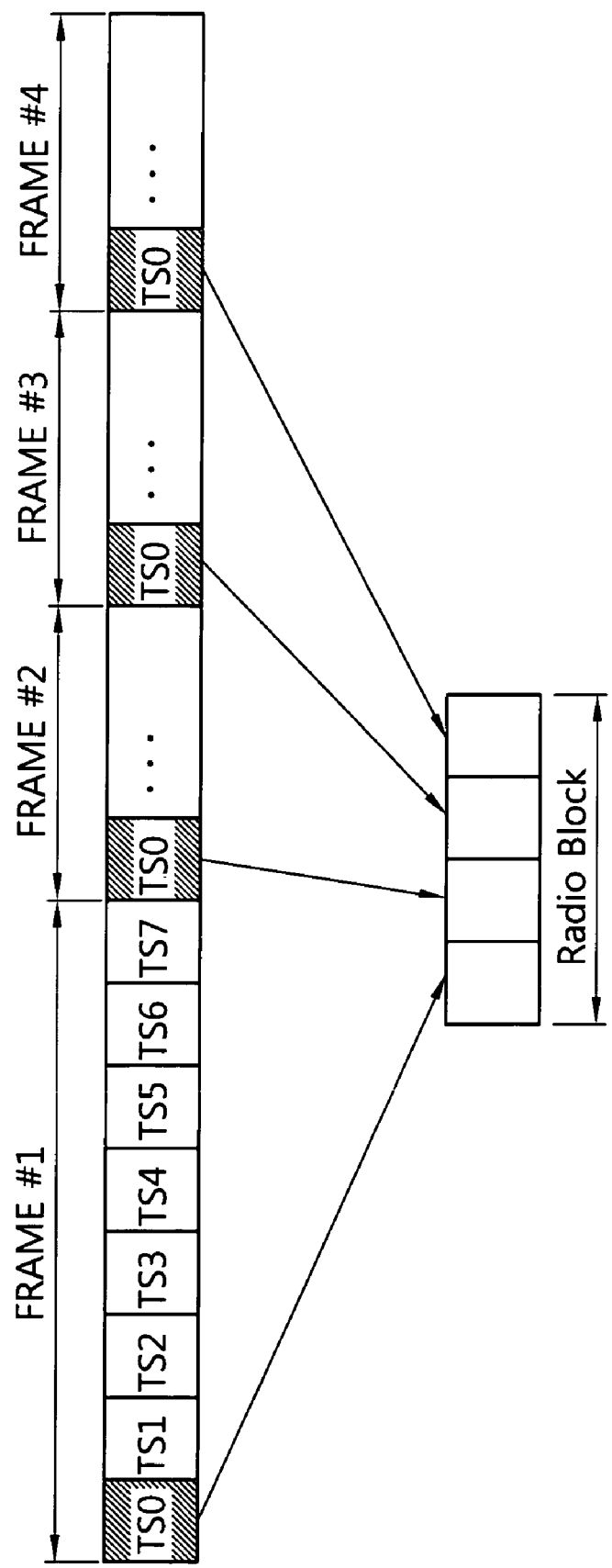
FIG. 3 shows a concept of a radio block.

FIG. 3 shows a concept of a radio block.

Referring to FIG. 3, one time division multiple access (TDMA) frame includes 8 timeslots TS0, TS1, . . . , and TS7 in an EGPRS/EGPRS2 system. The radio block consists of 4 timeslots, each of which belongs to a different TDMA frame. For example, the radio block may be configured by selecting the $1^{st}$ timeslot TS0 of each of four consecutive frames. Although the $1^{st}$ timeslot TS0 is selected herein, it is also possible to select other timeslots. This structure of the radio block is exemplary purpose only. The radio block may be composed of 4 timeslots over 2 TDMA frames.

A channel, i.e. a timeslot sequence, uses the same timeslot number in every TDMA frame and is defined by a timeslot number and a TDMA frame number sequence. A timeslot sequence is regarded as a timeslot unless there is any explicit different explanation in this description.

A mean bit error probability (BEP) (i.e., MEAN_BEP) for one radio block can be obtained according to Equation 1 below.

$$\text{MEAN\_BEP}_{block} = \frac{1}{4}\sum_{i=1}^{4} BEP_{burst\ i} \quad \text{[Equation 1]}$$

In Equation 1, $BEP_{burst\ i}$ denotes a BEP for an $i^{th}$ burst. A burst denotes information carried on one timeslot. Here, one timeslot means a single timeslot in one TDMA frame.

A coefficient of variation of BEP (i.e., CV_BEP) for the radio block can be obtained according to Equation 2 below.

$$CV\_BEP_{block} = \frac{\sqrt{\frac{1}{3}\sum_{k=1}^{4}\left(BEP_{burst\,k} - \frac{1}{4}\sum_{i=1}^{4}BEP_{burst\,i}\right)^2}}{\frac{1}{4}\sum_{i=1}^{4}BEP_{burst\,i}} \quad \text{[Equation 2]}$$

The link quality parameter is obtained by averaging BEPs for all radio blocks dedicated to an MS with respect to each channel (timeslot) and each modulation scheme. A reliability $R_n$ of quality parameters for each modulation scheme is defined as expressed by Equation 3 below.

$$R_n = (1-e)\cdot R_{n-1} + e\cdot x_n, \; R_{-1} = 0 \quad \text{[Equation 3]}$$

In Equation 3, n denotes an iteration index which is increased for each downlink radio block. The parameter e denotes a forgetting factor for performing filtering on the MSs. The forgetting factor e can be determined according to a BEP period transmitted from the BS. The forgetting factor e can be delivered to the MS by using a system information message broadcast from the BS. In some cases an optional parameter is transmitted in dedicated messages. Depending on which BEP period parameter is used, the filtering can be the same for all MS or can be specific. The parameter $x_n$ is a value indicating a presence/absence of a link quality parameter for an $n^{th}$ radio block with respect to each modulation scheme. The value $x_n$ may be '0' or '1' according to the presence/absence of the link quality parameter.

By using the reliability, with respect to radio blocks having a TFI of the MS itself, the MS obtains the MEAN_BEP and CV_BEP for each timeslot according to the following equations.

$$MEAN\_BEP\_TN_n = \quad \text{[Equation 4]}$$
$$\left(1 - e\frac{x_n}{R_n}\right) \cdot MEAN\_BEP\_TN_{n-1} + e\frac{x_n}{R_n} \cdot MEAN\_BEP_{block,n}$$

$$CV\_BEP\_TN_n = \quad \text{[Equation 5]}$$
$$\left(1 - e\frac{x_n}{R_n}\right) \cdot CV\_BEP\_TN_{n-1} + e\frac{x_n}{R_n} CV\_BEP_{block,n}$$

Herein, the obtained link quality parameters are for radio blocks formed using one timeslot per frame. Here, one timeslot means a single timeslot in one TDMA frame.

In the EGPRS/EGPRS2 system, a plurality of timeslots can be assigned to the MS. Thus, for each modulation scheme, the MEAN_BEP and CV_BEP are obtained by performing an averaging operation over all channels assigned to the MS (i.e., timeslots for the received radio blocks having the same TFI as the MS). This averaging is performed over a reporting period.

$$MEAN\_BEP_n = \frac{\sum_j R_n^{(j)} \cdot MEAN\_BEP\_TN_n^{(j)}}{\sum_j R_n^{(j)}} \quad \text{[Equation 6]}$$

$$CV\_BEP_n = \frac{\sum_j R_n^{(j)} \cdot CV\_BEP\_TN_n^{(j)}}{\sum_j R_n^{(j)}} \quad \text{[Equation 7]}$$

Herein, n denotes an iteration index at the time of reporting, and j denotes a channel number. When a new cell is selected or when an MS is entering a packet transfer mode or a MAC-shared mode, the iteration index n is reset to '0'. If a new timeslot is assigned for a downlink TBF, then MEAN_BEP_TNn-1, CV_BEP_TNn-1, and Rn-1 for that timeslot are reset to '0'.

The MS reports all MEAN_BEPs and CV_BEPs which are calculated according to Equations 6 and 7 above with respect to each modulation scheme. Further, according to the request of the network, the MS can report measurement values for each timeslot, that is, MEAN_BEP_TN and CV_BEP_TN.

As described above, in the EGPRS/EGPRS2, the link quality is measured, calculated and reported for each modulation scheme. Therefore, if the link quality can be reported for all modulation schemes used in the EGPRS2, an optimal link adaptation can be performed. However, reporting of the link quality for all modulation schemes results in a signalling overhead and thus may deteriorate the data rate. Moreover, the overhead is too large to report the link quality for all modulation schemes for every assigned timeslot.

According to a current EGPRS/EGPRS2 standard, a packet downlink assignment message is used as a control message related to the link quality report. Table 1 below shows a part of the content of the packet downlink assignment message disclosed in clause 11.2.7 of 3GPP TS 44.060 V7.10.0 (2007-09) "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)".

TABLE 1

< Packet Downlink Assignment message content > ::=
...
  { 0 | 1 < EGPRS Window Size : < EGPRS Window Size IE >>
    < LINK_QUALITY_MEASUREMENT_MODE : bit (2) >
    < EGPRS2_LINK_QUALITY_MEASUREMENT_MODE :
    bit (1) >
    { 0 | 1 < BEP_PERIOD2 : bit(4) > } }
...

In Table 1, the 'LINK_QUALITY_MEASUREMENT_MODE' field determines a measurement value included in 'EGPRS Timeslot Link Quality Measurements Type 2'. The 'EGPRS2_LINK_QUALITY MEASUREMENT_MODE' field determines a measurement value included in 'EGPRS BEP Link Quality Measurements Type 2'. The 'EGPRS Timeslot Link Quality Measurements Type 2' and the 'EGPRS BEP Link Quality Measurements Type 2' are information elements (IEs) included in an EGPRS packet downlink acknowledgement/negative-acknowledgement (Ack/Nack) message. The EGPRS packet downlink Ack/Nack message indicates a state of a received RLC data block and is an uplink message transmitted through a packet associated control channel (PACCH) to report downlink channel quality.

The 'EGPRS BEP Link Quality Measurements Type 2' includes information specified using the 'EGPRS2 LINK QUALITY MEASUREMENT MODE' field. If a value of the 'EGPRS2 LINK QUALITY MEASUREMENT MODE' field is '0', the MS reports MEAN_BEP and CV_BEP for all modulation schemes used in the received radio blocks by using the 'EGPRS BEP Link Quality Measurements Type 2'. If the value of the 'EGPRS2_LINK_QUALITY_ MEASUREMENT_MODE' field is '1', the MS reports MEAN_BEP and CV_BEP for two modulation schemes by using the 'EGPRS BEP Link Quality Measurements Type 2'. Table 2 below shows a part of the content of the 'EGPRS BEP Link Quality Measurements Type 2' disclosed in clause 12.5a.3 of 3GPP TS 44.060 V7.10.0 (2007-09).

TABLE 2

```
<EGPRS BEP Link Quality Measurements Type 2 IE> ::=
    { 0 | 1   < GMSK__MEAN__BEP : bit (5) >
              < GMSK__CV__BEP : bit (3) >}
    { 0 | 1   < 8PSK__MEAN__BEP : bit (5) >
              < 8PSK__CV__BEP : bit (3) > }
    { 0 | 1   < QPSK__MEAN__BEP : bit (5) >
              < QPSK__CV__BEP : bit (3) > }
    { 0 | 1   < 16QAM__MEAN__BEP : bit (5) >
              < 16QAM__CV__BEP : bit (3) > }
    { 0 | 1   < 32QAM__MEAN__BEP : bit (5) >
              < 32QAM__CV__BEP : bit (3) > };
```

The 'EGPRS Timeslot Link Quality Measurements Type 2' includes information specified using the 'LINK_QUALITY_MEASUREMENT_MODE' field. Table 3 below shows a part of the content of the 'EGPRS Timeslot Link Quality Measurements Type 2' disclosed in clause 12.5a.3 of 3GPP TS 44.060 V7.10.0 (2007-09).

TABLE 3

```
<EGPRS Timeslot Link Quality Measurements Type 2 IE> ::=
<BEP Measurement Report Struct > ::=
    < Reported__Modulations: bit (3) >
    { 0 | 1   { 0 <MODULATION__1__MEAN__BEP__TN0 : bit (4) >
              | 1 < MODULATION__2__MEAN__BEP__TN0 : bit (4) >}}
    { 0 | 1   { 0 <MODULATION__1__MEAN__BEP__TN1 : bit (4) >
              | 1 < MODULATION__2__MEAN__BEP__TN1 : bit (4) >}}
    { 0 | 1   { 0 <MODULATION__1__MEAN__BEP__TN2 : bit (4) >
              | 1 < MODULATION__2__MEAN__BEP__TN2 : bit (4) >}}
    { 0 | 1   { 0 <MODULATION__1__MEAN__BEP__TN3 : bit (4) >
              | 1 < MODULATION__2__MEAN__BEP__TN3 : bit (4) >}}
    { 0 | 1   { 0 <MODULATION__1__MEAN__BEP__TN4 : bit (4) >
              | 1 < MODULATION__2__MEAN__BEP__TN4 : bit (4) >}}
    { 0 | 1   { 0 <MODULATION__1__MEAN__BEP__TN5 : bit (4) >
              | 1 < MODULATION__2__MEAN__BEP__TN5 : bit (4) >}}
    { 0 | 1   { 0 <MODULATION__1__MEAN__BEP__TN6 : bit (4) >
              | 1 < MODULATION__2__MEAN__BEP__TN6 : bit (4) >}}
    { 0 | 1   { 0 <MODULATION__1__MEAN__BEP__TN7 : bit (4) >
              | 1 < MODULATION__2__MEAN__BEP__TN7 : bit (4) >}};
```

The 'Reported_Modulations' field indicates for each timeslot two reported modulation schemes. The MS reports MEAN_BEP for the most used modulation scheme during a reporting period between the two modulation schemes specified using the 'Reported_Modulations' field. Table 4 below shows the content of the 'Reported_Modulations' field disclosed in clause 12.5a.3 of the reference.

TABLE 4

| Reported_Modulations (3 bit field) | | | | |
|---|---|---|---|---|
| bit | | | | |
| 3 | 2 | 1 | MODULATION_1 | MODULATION_2 |
| For EGPRS2-A: | | | | |
| 0 | 0 | 0 | GMSK | 8PSK |
| 0 | 0 | 1 | GMSK | 16QAM |
| 0 | 1 | 0 | GMSK | 32QAM |
| 0 | 1 | 1 | 8PSK | 16QAM |
| 1 | 0 | 0 | 8PSK | 32QAM |
| 1 | 0 | 1 | 16QAM | 32QAM |
| 1 | 1 | 0 | reserved | |
| 1 | 1 | 1 | reserved | |
| For EGPRS2-B: | | | | |
| 0 | 0 | 0 | GMSK | QPSK |
| 0 | 0 | 1 | GMSK | 16QAM |
| 0 | 1 | 0 | GMSK | 32QAM |
| 0 | 1 | 1 | QPSK | 16QAM |

TABLE 4-continued

| Reported_Modulations (3 bit field) | | | | |
|---|---|---|---|---|
| bit | | | | |
| 3 | 2 | 1 | MODULATION_1 | MODULATION_2 |
| 1 | 0 | 0 | QPSK | 32QAM |
| 1 | 0 | 1 | 16QAM | 32QAM |
| 1 | 1 | 0 | reserved | |
| 1 | 1 | 1 | reserved | |

When the link quality is reported using the 'EGPRS Timeslot Link Quality Measurements Type 2' according to the aforementioned method, there are several problems as indicated below.

First, reporting of link quality for a modulation scheme to be reported may be unsuccessful. For example, it is assumed that an MS supporting the EGPRS2-A uses '000' as a value for the 'Reported_Modulations' field. That is, for each assigned timeslot, the MS selects the GMSK and 8-PSK, and reports link quality for the most used modulation scheme between the GMSK and the 8-PSK. It is also assumed that timeslots 1, 2, 3, and 5 are assigned to the MS. According to the conventional method, if the most used modulation scheme for the timeslots 1, 2, and 5 is the GMSK or 8-PSK and the most used modulation scheme for the timeslot 3 is the 16-QAM, then the MS cannot report link quality for the 16-QAM at the timeslot 3 and thus have to report link quality for the GMSK or 8-PSK. This is because the 'Reported_Modulations' field indicates only two specified modulation schemes. Therefore, if a specific modulation scheme is more used in one of the assigned timeslots than the modulation schemes indicated using the 'Reported_Modulations' field, the MS cannot report link quality for the specific modulation scheme in that timeslot.

Second, link quality may be reported in a duplication manner. According to the value of the 'EGPRS2 LINK QUALITY MEASUREMENT MODE' field, the MS reports link quality for all modulation schemes or for two modulation schemes by using the 'EGPRS BEP Link Quality Measurements Type 2'. The 'EGPRS BEP Link Quality Measurements Type 2' is regularly reported to the network. The 'EGPRS Timeslot Link Quality Measurements Type 2' is irregularly reported according to the value of the 'LINK QUALITY MEASUREMENT MODE' field. That is, the network is regularly provided with an average link quality for all assigned timeslots with respect to all modulation schemes or to two modulation schemes by using the 'EGPRS BEP Link Quality Measurements Type 2'. When considering unpredictable and variable wireless environment, it is better for the network to receive many pieces of information regarding link quality. However, according to the conventional method of reporting link quality, when the value of the 'EGPRS2 LINK QUALITY MEASUREMENT MODE' field is '1', the network receives almost duplicated information via the 'EGPRS BEP Link Quality Measurements Type 2' and the 'EGPRS Timeslot Link Quality Measurements Type 2', unless the MS experiences fast fading. A difference of the two IEs lies in that one IE includes 'per timeslot MEAN_BEP' and the other IE includes 'non-per timeslot MEAN_BEP'. Thus, the link quality reported using the two IEs can be regarded as duplicated information.

Third, link quality may be reported for an unused timeslot. Assume that timeslots are reconfigured during the reporting period, and that some timeslots assigned through timeslot reconfiguration are not the same as timeslots used before timeslot reconfiguration. According to the conventional method, the MS can consider the use of one or several timeslots which are no longer used after the timeslot reconfiguration when two modulation schemes are selected. As a result, the MS may not be able to correctly report link quality after timeslot reconfiguration. It is undesirable to consider the use of the timeslot which is no longer used. The MS needs to report link quality for currently assigned timeslots.

Fourth, a link state may not be able to be correctly used. From the perspective of a statistical analysis, when a sufficiently large number of samples are used, a representative value is an average value of the samples. In a wireless environment, there are numerous factors (i.e., deep fading, scatter, interference, etc.,) that distort an original signal. In an arbitrarily variable wireless environment, link quality can be useful in the statistical analysis when a small number of radio blocks is guaranteed for a reported modulation scheme. According to the conventional method, modulation schemes indicated using the 'Reported_Modulations' field may not be related to the number of radio blocks in each assigned timeslot. This means that the number of radio blocks for the modulation schemes indicated using the 'Reported Modulations' field for each assigned timeslot cannot guarantee the smallest number of radio blocks required for the effective statistical analysis. Considering an unnecessary sample that experiences devastating fast fading due to an instantaneous large obstacle, the influence of the unnecessary sample cannot be eliminated when an insufficient number samples are averaged. Therefore, a current link state may not be appropriately indicated using the reported link quality.

Figure 4:
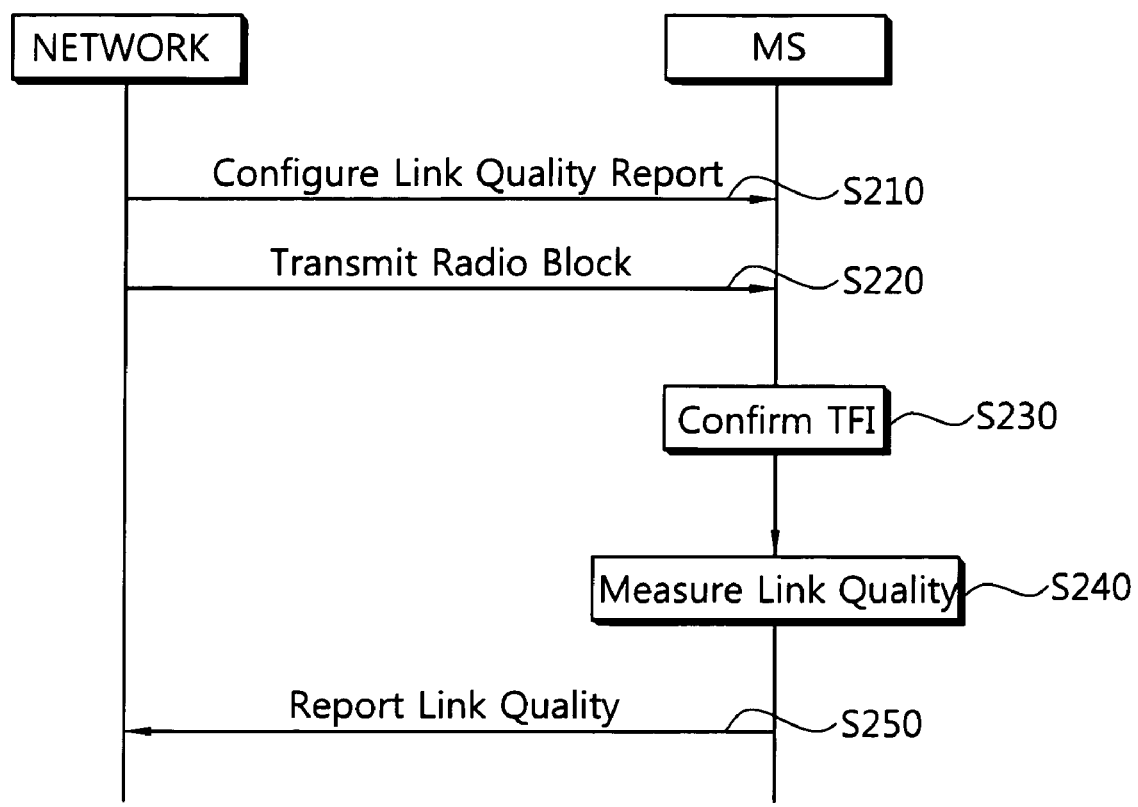
FIGS. 4 and 5 are flow diagrams illustrating a method of reporting link quality according to two embodiments of the present invention.

FIG. 4 is a flow diagram illustrating a method of reporting link quality according to an embodiment of the present invention.

Referring to FIG. 4, in a step S210, a network configures a link quality report and provides instructions to an MS through a packet downlink assignment message. To assign a downlink resource to the MS, the packet downlink assignment message is transmitted on a packet common control channel (PCCCH) or a packet associated control channel (PACCH).

Table 5 below shows an example of an information element (IE) included in the packet downlink assignment message to configure the link quality report.

TABLE 5

< Packet Downlink Assignment message content > ::=
...
    { 0 | 1 < EGPRS Window Size : < EGPRS Window Size IE >>
        < LINK_QUALITY_MEASUREMENT_MODE : bit (2) >
        < EGPRS2_LINK_QUALITY_MEASUREMENT_MODE :
        bit (1) >
        { 0 | 1 < BEP_PERIOD2 : bit(4) > } }
...

Each field of Table 5 above is described in Table 6 below.

TABLE 6

EGPRS Window Size
This information element defines the window size to be used in an EGPRS TBF. The network sets the window size according to the number of timeslots assigned in the direction of the TBF.
LINK_QUALITY_MEASUREMENT_MODE (2 bit field)
This field determines the measurements to be included within the EGPRS Timeslot Link Quality Measurements IE or EGPRS Timeslot Link Quality Measurements Type 2 IE.
bit
2 1

0 0 The MS does not report either interference measurements (γ values) or per slot BEP measurements.
0 1 The MS reports available interference measurements (γ values) for timeslots 0 through 7. The γ value is
    defined in 3GPP TS 45.008. No per slot mean BEP measurements shall be reported.
1 0 The MS reports the mean BEP on each assigned time slot. In case of EGPRS, the MS reports the mean BEP
    measurement corresponding to the modulation for which it has received a larger number of blocks since the
    previous report. In case of EGPRS2, the MS reports both MEAN_BEP_TNx and
    REPORTED_MODULATION (see below). The MS makes BEP measurements only on Radio Blocks
    intended for it. No interference measurements (γ values) shall be reported.
1 1 The MS reports the mean BEP on each assigned time slot. In case of EGPRS, the MS reports the mean BEP
    measurement corresponding to the modulation for which it has received a larger number of blocks since the
    previous report. In case of EGPRS2, the MS reports both MEAN_BEP_TNx and
    REPORTED_MODULATION (see below). The MS makes BEP measurements only on Radio Blocks
    intended for it. In addition to mean BEP, the MS reports interference measurements (γ values) for no more
    than four time slots. If the MS has interference measurements for more than four timeslots to report, the
    selection of timeslots for which measurements are included in each message is implementation specific,
    subject to the requirement that a measurement for each time slot, unless not available (see 3GPP TS 45.008),
    is included in at least every other report.
EGPRS2_LINK_QUALITY_MEASUREMENT_MODE (1 bit field)
This field determines the measurements to be included within the EGPRS BEP Link Quality Measurements Type 2 IE. It is applicable only to MSs with one or more downlink TBFs using EGPRS2.
bit 0 The MS reports in the EGPRS BEP Link Quality Measurements Type 2 IE the mean_BEP and CV_BEP for all
    modulation schemes used on blocks which it has received since the previous report
1 The MS reports in the EGPRS BEP Link Quality Measurements Type 2 IE the mean_BEP and CV_BEP for
    the two modulation schemes with the highest number of blocks received since the previous report, unless only
    one modulation scheme was used on all blocks received since the previous report, in which case the
    mean_BEP and CV_BEP for this modulation scheme only shall be reported.
BEP_PERIOD2 (4 bit field)
This field contains a constant which is used for filtering channel quality measurements in EGPRS. For details see 3GPP TS 45.008.
Range: 0 to 15

The 'LINK_QUALITY_MEASUREMENT_MODE' field is used to configure a link quality report (i.e., MEAN_BEP_TN and/or CV_BEP_TN) for each timeslot. The 'EGPRS2_LINK_QUALITY_MEASUREMENT_MODE' field is used to configure an average link quality report (i.e., MEAN_BEP and/or CV_BEP) throughout all assigned timeslots. In particular, if a value of the 'LINK_QUALITY_MEASUREMENT_MODE' field is '10' or '11', the MS selects the modulation scheme which is the most used in a specific timeslot within all the assigned timeslots since the last report, and reports the selected modulation scheme (i.e., REPORTED_MODULATION) and link quality (i.e., MEAN_BEP_TNx) for the selected modulation scheme. In other words, the mobile station shall report the modulation scheme which has received the largest number of radio blocks on each currently assigned timeslot as well as the channel quality parameter for that modulation scheme.

In a Step 220, the network transmits a radio block to the MS. The transmission is made in a packet transfer mode.

In a step 230, the MS determines whether the radio block has the identifier of the MS itself, that is, the TFI of the MS itself. While downlink TBF transmission is made, the MS measures received (Rx) signal quality. The signal quality is measured for the radio block of a specified MS. According to the TFI, the MS determines whether the received radio block is dedicated for the MS itself. For example, when an RLC/MAC data block is transmitted using the radio block, the MS can confirm the TFI through an RLC/MAC header since the RLC/MAC header always includes the TFI.

In a step 240, the MS measures the link quality upon confirming the TFI. The MS measures the link quality for the radio blocks including a TFI identical to the TFI assigned to the MS itself. The signal quality of each channel is measured burst by burst. A bit error probability (BEP) can be used for measuring link quality. The BEP includes MEAN_BEP and CV_BEP. The BEP is measured for all used modulation schemes. For example, if a system supports Gaussian minimum shift keying (GMSK), 8-phase shift keying (8-PSK), 16-quadrature amplitude modulation (16-QAM), and 32-QAM, then the MEAN_BEP and CV_BEP are measured for all four modulation schemes.

In a step 250, the MS reports to the network the link quality computed for a modulation scheme to be reported. The MS can report the link quality through a packet associated control channel (PACCH) such as by using an EGPRS packet downlink Ack/Nack type 2 message.

The EGPRS packet downlink Ack/Nack type 2 message indicates states of received downlink radio blocks, and is used to report a downlink channel state.

Table 7 below shows an example of an IE included in the EGPRS packet downlink Ack/Nack type 2 message.

TABLE 7

< EGPRS Packet Downlink Ack/Nack Type 2 message content > ::=
...
{ 0 | 1 < EGPRS Channel Quality Report Type 2 :
< EGPRS Channel Quality Report Type 2 IE > >}
< EGPRS Ack/Nack Description : < EGPRS Ack/Nack
Description IE >>
...

The 'EGPRS Ack/Nack Description' Information Element includes an RLC parameter indicating an Ack or a Nack for a group of RLC data blocks.

An 'EGPRS Channel Quality Report Type 2' Information Element shows downlink quality. An example thereof is shown in Table 8 below.

TABLE 8

< EGPRS Channel Quality Report Type 2 > ::=
  < EGPRS BEP Link Quality Measurements Type 2 : < EGPRS BEP
Link Quality Measurements Type 2 IE>>
  < C_VALUE : bit (6) >
  < EGPRS Timeslot Link Quality Measurements Type 2 : <EGPRS
Timeslot Link Quality Measurements Type 2 IE >> ;

The 'C_VALUE' field is a normalized Rx signal level in the MS. The actual value of the 'C_VALUE' field can be calculated as disclosed in clause 10.2.3.1 of the 3GPP TS 45.008 V7.6.0 (2006-11) "Radio Access Network; Radio subsystem link control (Release 7)".

The 'EGPRS BEP Link Quality Measurements Type 2' Information Element is used to report an average link quality (i.e., MEAN_BEP and/or CV_BEP) throughout all assigned timeslots. That is, the 'EGPRS BEP Link Quality Measurements Type 2' Information Element includes the MEAN_BEP and CV_BEP averaged throughout all timeslots in the EGPRS2. Table 9 below shows an example of the 'EGPRS BEP Link Quality Measurements Type 2' Information Element.

TABLE 9

<EGPRS BEP Link Quality Measurements Type 2 IE> ::=
    { 0 | 1   < GMSK_MEAN_BEP : bit (5) >
              < GMSK_CV_BEP : bit (3) >}
    { 0 | 1   < 8PSK_MEAN_BEP : bit (5) >
              < 8PSK_CV_BEP : bit (3) > }
    { 0 | 1   < QPSK_MEAN_BEP : bit (5) >
              < QPSK_CV_BEP : bit (3) > }
    { 0 | 1   < 16QAM_MEAN_BEP : bit (5) >
              < 16QAM_CV_BEP : bit (3) > }
    { 0 | 1   < 32QAM_MEAN_BEP : bit (5) >
              < 32QAM_CV_BEP : bit (3) > };

As indicated above, the EGPRS2 uses five modulation schemes, that is, GMSK, 8-PSK, QPSK, 16-QAM, and 32-QAM. The 'EGPRS BEP Link Quality Measurements Type 2' Information Element includes MEAN_BEP and CV_BEP for each modulation scheme.

The 'EGPRS Timeslot Link Quality Measurements Type 2' Information Element is configured using a 'EGPRS2 LINK QUALITY MEASUREMENT MODE' field, and is used to report link quality for each assigned timeslot. Table 10 below shows an example of the 'EGPRS Timeslot Link Quality Measurements Type 2' Information Element.

TABLE 10

<EGPRS Timeslot Link Quality Measurements Type 2 IE> ::=
{ 0 | 1 < BEP_MEASUREMENTS : BEP Measurement Report Struct >}
{ 0 | 1 < INTERFERENCE_MEASUREMENTS : Interference Measurement Report Struct >};

TABLE 10-continued

```
< BEP Measurement Report Struct > ::=
   { 0 | 1 < REPORTED_MODULATION : bit (2) >  <MEAN_BEP_TN0 : bit (4) > }
   { 0 | 1 < REPORTED_MODULATION : bit (2) >  <MEAN_BEP_TN1 : bit (4) > }
   { 0 | 1 < REPORTED_MODULATION : bit (2) >  <MEAN_BEP_TN2 : bit (4) > }
   { 0 | 1 < REPORTED_MODULATION : bit (2) >  <MEAN_BEP_TN3 : bit (4) > }
   { 0 | 1 < REPORTED_MODULATION : bit (2) >  <MEAN_BEP_TN4 : bit (4) > }
   { 0 | 1 < REPORTED_MODULATION : bit (2) >  <MEAN_BEP_TN5 : bit (4) > }
   { 0 | 1 < REPORTED_MODULATION : bit (2) >  <MEAN_BEP_TN6 : bit (4) > }
   { 0 | 1 < REPORTED_MODULATION : bit (2) >  <MEAN_BEP_TN7 : bit (4) > };
< Interference Measurement Report Struct > ::=
   { 0 | 1 < I_LEVEL_TN0 : bit (4) > }
   { 0 | 1 < I_LEVEL_TN1 : bit (4) > }
   { 0 | 1 < I_LEVEL_TN2 : bit (4) > }
   { 0 | 1 < I_LEVEL_TN3 : bit (4) > }
   { 0 | 1 < I_LEVEL_TN4 : bit (4) > }
   { 0 | 1 < I_LEVEL_TN5 : bit (4) > }
   { 0 | 1 < I_LEVEL_TN6 : bit (4) > }
   { 0 | 1 < I_LEVEL_TN7 : bit (4) > };
```

The 'INTERFERENCE_MEASUREMENTS' field includes a value γ which is calculated from timeslots 0 to 7. This value can be calculated as disclosed in clause 10.2.3.1 of 3GPP TS 45.008 V7.6.0 (2006-11).

The 'BEP_MEASUREMENTS' struct includes both a modulation scheme and a link quality which are reported for each assigned timeslot. A 'REPORTED_MODULATION' field indicates the reported modulation scheme. A 'MEAN_BEP_TNn' field indicates MEAN_BEP for an $n^{th}$ timeslot with respect to the modulation scheme indicated using the 'REPORTED MODULATION' field. Table 11 shows an example of the 'REPORTED MODULATION' field for EGPRS2-A and EGPRS2-B.

TABLE 11

REPORTED_MODULATION (2 bit field)
The mobile station shall, for each of its currently assigned timeslots, report the modulation scheme (indicated using the REPORTED_MODULATION field) with which it has received the largest number of blocks since the last report and shall report the MEAN_BEP_TNx of that modulation scheme.
The mapping of the modulation scheme is as follows.

| bit 2 | bit 1 | |
|---|---|---|
| For EGPRS2-A: | | |
| 0 | 0 | GMSK |
| 0 | 1 | 8PSK |
| 1 | 0 | 16QAM |
| 1 | 1 | 32QAM |
| For EGPRS2-B: | | |
| 0 | 0 | GMSK |
| 0 | 1 | QPSK |
| 1 | 0 | 16QAM |
| 1 | 1 | 32QAM |

According to the proposed method of reporting link quality, the MS selects a modulation scheme which is the most used in a specific timeslot within all assigned timeslots since the last report, and reports the selected modulation scheme and link quality for the selected modulation scheme. This means that, for each assigned timeslot, the MS reports a modulation scheme, which is the most used among the received radio blocks, and link quality of that modulation scheme. The most used modulation scheme is specified for each timeslot, and the MS reports the specified modulation scheme to the network. Therefore, link quality reporting can be flexibly supported even if a modulation scheme is added or modified in the EGPRS2 or an evolved system of the EGPRS2. The network can perform a link adaptation process by determining a modulation and coding scheme according to the reported link quality.

The MS can report an accurate link quality for each assigned timeslot by reporting a link quality for the modulation scheme with which the largest number of radio blocks is received on each of assigned timeslots. To avoid reporting duplicated information, the MS reports a link quality for a modulation scheme in which an averaging operation is performed throughout all assigned timeslots by using the 'EGPRS BEP Link Quality Measurements Type 2' IE, and reports a link quality of the most used modulation scheme for each assigned timeslot by using the 'EGPRS Timeslot Link Quality Measurements Type 2' IE.

If the network can know the link quality in the uplink radio resource request operation, radio resources can be effectively assigned also in the EGPRS2 system. Therefore, performance of the EGPRS2 system can be improved by allowing the MS to transmit to the network the link quality for various modulation schemes additionally supported in the EGPRS2 by using the packet resource request message.

The MS reports the link quality of the modulation scheme with which a largest number of radio blocks are received on each of currently assigned timeslots, and does not consider the use of a timeslot which is no longer used. By reporting the link quality of the modulation scheme for the largest number of radio blocks, a smallest number of radio blocks can be further surely guaranteed so that the statistical analysis is useful.

The MS reports not only the link quality but also the modulation scheme with which the largest number of radio blocks is received on each of assigned timeslots. Accordingly, radio resources can be effectively used, and an overall throughput can be improved.

Meanwhile, according to GP-080266 introduced by Nokia in February of 2008, a technique for multiplexing the EGPRS, EGPRS2-A and the EGPRS2-B has been proposed. In this technique, three modulation schemes are added to the EGPRS2-B. That is, the 8-PSK, 16-QAM with normal symbol rate (NSR), and 32-QAM with NSR which are supported by the EGPRS2-A are added to the GMSK, QPSK, 16-QAM with higher symbol rate (HSR), and 32-QAM with HSR which are supported by the conventional EGPRS2-B, so that the EGPRS2-B can support the GMSK, QPSK, 8-PSK, 16-QAM with NSR, 16-QAM with HSR, 32-QAM with NSR, and 32-QAM with NSR. The NSR and the HSR use the same modulation scheme. However, a complex-valued symbol (also referred to as a modulation symbol) of a modulation scheme with the HSR has a frequency bandwidth about 1.2 times larger than a complex-valued symbol of a modulation scheme with the NSR. Since one modulation scheme supports a higher symbol rate than the other modulation scheme, the two modulation schemes can be distinguished. For example, 16-QAM used in the conventional EGPRS2-B has a higher symbol rate than 16-QAM used in the conventional EGPRS2-A. The former is referred to as 16-QAM HSR, and the latter is referred to as 16-QAM NSR.

When the EGPRS2-A is multiplexed to the EGPRS2-B, the 'EGPRS BEP Link Quality Measurements Type 2' IE described in Table 9 above can be modified as shown in Table 12 below.

TABLE 12

<EGPRS BEP Link Quality Measurements Type 2 IE> ::=
    { 0 | 1    < GMSK_MEAN_BEP : bit (5) >
                < GMSK_CV_BEP : bit (3) >}
    { 0 | 1    < 8PSK_MEAN_BEP : bit (5) >
                < 8PSK_CV_BEP : bit (3) > }
    { 0 | 1    < QPSK_MEAN_BEP : bit (5) >
                < QPSK_CV_BEP : bit (3) > }
    { 0 | 1    < 16QAM_HSR_MEAN_BEP : bit (5) >
                < 16QAM_HSR_CV_BEP : bit (3) > }
    { 0 | 1    < 32QAM_HSR_MEAN_BEP : bit (5) >
                < 32QAM_HSR_CV_BEP : bit (3) > }
    { 0 | 1    < 16QAM_NSR_MEAN_BEP : bit (5) >
                < 16QAM_NSR_CV_BEP : bit (3) > }
    { 0 | 1    < 32QAM_NSR_MEAN_BEP : bit (5) >
                < 32QAM_NSR_CV_BEP : bit (3) > };

In a 'BEP_MEASUREMENTS' struct, to support additional modulation schemes, a 'REPORTED_MODULATION' field indicating a modulation scheme reported for each timeslot may be a 3-bit field as shown in Table 13 below.

TABLE 13

REPORTED_MODULATION (3 bit field)

| bit | | | |
|---|---|---|---|
| 3 | 2 | 1 | |
| For EGPRS2-A: | | | |
| 0 | 0 | 0 | GMSK |
| 0 | 0 | 1 | 8PSK |
| 0 | 1 | 0 | 16QAM NSR |
| 0 | 1 | 1 | 32QAM NSR |
| For EGPRS2-B: | | | |
| 0 | 0 | 0 | GMSK |
| 0 | 0 | 1 | QPSK |
| 0 | 1 | 0 | 16QAM HSR |
| 0 | 1 | 1 | 16QAM NSR |
| 1 | 0 | 0 | 32QAM HSR |
| 1 | 0 | 1 | 32QAM NSR |

A problem occurs when the number of bits of the 'REPORTED_MODULATION' field is increased to 3 bits only for the EGPRS2-B. The problem is that a total size of the 'BEP_MEASUREMENTS' struct increases. In addition, in most cases, the possibility of concurrently using seven modulation schemes during one reporting period is low. Therefore, the number of bits of the 'REPORTED_MODULATION' field may be set to two bits.

In a method to be described below, the 'REPORTED_MODULATION' field is set to two bits and is configured by selecting four modulation schemes from seven modulation schemes used in the EGPRS2-B. Modulation schemes selected for configuring the 'REPORTED_MODULATION' field are referred to as candidate modulation schemes. The MS selects the most used modulation scheme from the candidate modulation schemes, and reports link quality for the selected modulation scheme. Regarding modulation schemes which were not selected to configure the 'REPORTED_MODULATION' field, link quality is not reported.

Table 14 below shows an example of selecting four modulation schemes other than modulation schemes of the EGPRS2-A to be multiplexed. This is a case where modulation schemes added for multiplexing are not frequently used in the EGPRS2-B.

TABLE 14

REPORTED_MODULATION (2 bit field)

| bit | | |
|---|---|---|
| 2 | 1 | |
| For EGPRS2-A: | | |
| 0 | 0 | GMSK |
| 0 | 1 | 8PSK |
| 1 | 0 | 16QAM NSR |
| 1 | 1 | 32QAM NSR |
| For EGPRS2-B: | | |
| 0 | 0 | GMSK |
| 0 | 1 | QPSK |
| 1 | 0 | 16QAM HSR |
| 1 | 1 | 32QAM HSR |

Table 15 below shows another example of selecting four modulation schemes. This is to enable the network to consider a link quality difference between the HSR and the NSR.

TABLE 15

REPORTED_MODULATION (2 bit field)

| bit | | |
|---|---|---|
| 2 | 1 | |
| For EGPRS2-A: | | |
| 0 | 0 | GMSK |
| 0 | 1 | 8PSK |
| 1 | 0 | 16QAM NSR |
| 1 | 1 | 32QAM NSR |
| For EGPRS2-B: | | |
| 0 | 0 | 16QAM NSR |
| 0 | 1 | 16QAM HSR |
| 1 | 0 | 32QAM NSR |
| 1 | 1 | 32QAM HSR |

Table 16 below shows another example of selecting four modulation schemes. Herein, the GMSK is replaced with the 8-PSK. Since the EGPRS2-B can be used to obtain a higher data rata than the EGPRS2-A, the GMSK is replaced with the 8-PSK by considering a possibility of reporting the 8-PSK instead of the GMSK for the further effective use of resources.

TABLE 16

REPORTED_MODULATION (2 bit field)

| bit 2 | bit 1 | |
|---|---|---|
| For EGPRS2-A: | | |
| 0 | 0 | GMSK |
| 0 | 1 | 8PSK |
| 1 | 0 | 16QAM NSR |
| 1 | 1 | 32QAM NSR |
| For EGPRS2-B: | | |
| 0 | 0 | QPSK |
| 0 | 1 | 8PSK |
| 1 | 0 | 16QAM HSR |
| 1 | 1 | 32QAM HSR |

With respect to the selected four modulation schemes, the MS reports, for each assigned timeslots, link quality for the modulation scheme most used among received radio blocks. The MS does not report link quality for any modulation scheme other than the four selected modulation schemes.

The above examples are for exemplary purposes only, and thus the four modulation schemes can be selected from the seven modulation schemes supporting the EGPRS2-B in various combinations. In addition, the configuration of the 'REPORTED_MODULATION' field may vary from one MS to another or from one time to another.

Generally speaking, the above examples relates to determining a subset of modulation schemes among a set of available modulation schemes and applying the criterion for selecting a modulation scheme to the sole modulation schemes of the subset. Depending on the embodiment, the set and the subset can be formed of any number of modulations schemes. In other words, the MS does not seem to need to take into account all of 7 modulation schemes for EGPRS2 channel quality reporting during the reporting period.

When the link quality reporting is instructed through the packet downlink message, the MS can report link quality only for the most used modulation scheme since the last report. If link quality is to be reported for two modulation schemes, the MS reports link quality of the two modulation schemes starting from the most used modulation scheme. If link quality is to be reported for three modulation schemes, the MS reports link quality of the three modulation schemes starting from the most used modulation scheme. That is, link quality is reported not for all modulation schemes but for some selected modulation schemes, and thus an overhead resulted from link quality reporting can be avoided.

A problem occurs when a plurality of different modulation schemes have the same number of transmitted radio blocks. That is, the problem is as to with which condition the MS has to report channel quality if link quality is to be reported for two modulation schemes and three or more modulation scheme (e.g., GMSK, 16-QAM, and 32-QAM) have the same number of received radio blocks.

In such a situation when there is a plurality of different modulation schemes with the same number of received radio blocks, a modulation scheme for reporting link quality can be selected in various manners. The selection of the modulation scheme may be predetermined in the MS or may be reported by the network to the MS.

According to an embodiment, link quality is reported for two high-order modulation schemes. For example, if the GMSK, 16-QAM, and 32-QAM are different modulation schemes with the same number of most received radio blocks received by the MS, the MS reports link quality for the 16-QAM and 32-QAM which are higher order modulation schemes than the GMSK. In other words, for EGPRS2 channel quality reporting per timeslot, if there are more than one modulation scheme having the same number and the largest number of blocks on a currently assigned timeslot, the MS shall report the MEAN_BEP_TNx for the highest order modulation scheme among those modulation schemes on that timeslot.

According to another embodiment, link quality is reported for two low-order modulation schemes. For example, if the GMSK, 16-QAM, and 32-QAM are different modulation schemes with the same number of most received radio blocks received by the MS, the MS reports link quality for the GMSK and 16-QAM.

According to another embodiment, link quality is reported for the modulation schemes with the lower MEAN_BEP. For example, if the GMSK, 16-QAM, and 32-QAM are different modulation schemes with the number of same most received radio blocks received by the MS where GMSK_MEAN_BEP is 0.001, 16QAM_MEAN_BEP is 0.003, 32QAM_MEAN_BEP is 0.005, and then link quality is reported for the GMSK and 16-QAM.

According to another embodiment, link quality is reported for a modulation scheme with a higher MEAN_BEP. For example, if the GMSK, 16-QAM, and 32-QAM are different modulation schemes with the same number of most received radio blocks received by the MS where GMSK_MEAN_BEP is 0.001, 16QAM_MEAN_BEP is 0.003, 32QAM_MEAN_BEP is 0.005, and then link quality is reported for the 16-QAM and 32-QAM.

Depending on the embodiment, the MS may report the link quality (i.e., MEAN_BEP_TN and CV_BEP_TN) using a timeslot unit, that is to say per timeslot or may report the average link quality (i.e., MEAN_BEP and CV-BEP) for a plurality of timeslots, that is to say throughout all assigned timeslots. The network can perform a link adaptation process by determining a modulation and coding scheme according to the reported link quality.

According to a method of the present invention, link quality is reported not for all but for some modulation schemes. Therefore, a signalling overhead is reduced, and performance deterioration is minimized in a link adaptation process. In addition, even in a case where there is a plurality of different modulation schemes with the same number of received radio blocks, an overall system performance can be increased by defining a modulation scheme whose link quality is to be reported.

Figure 5:
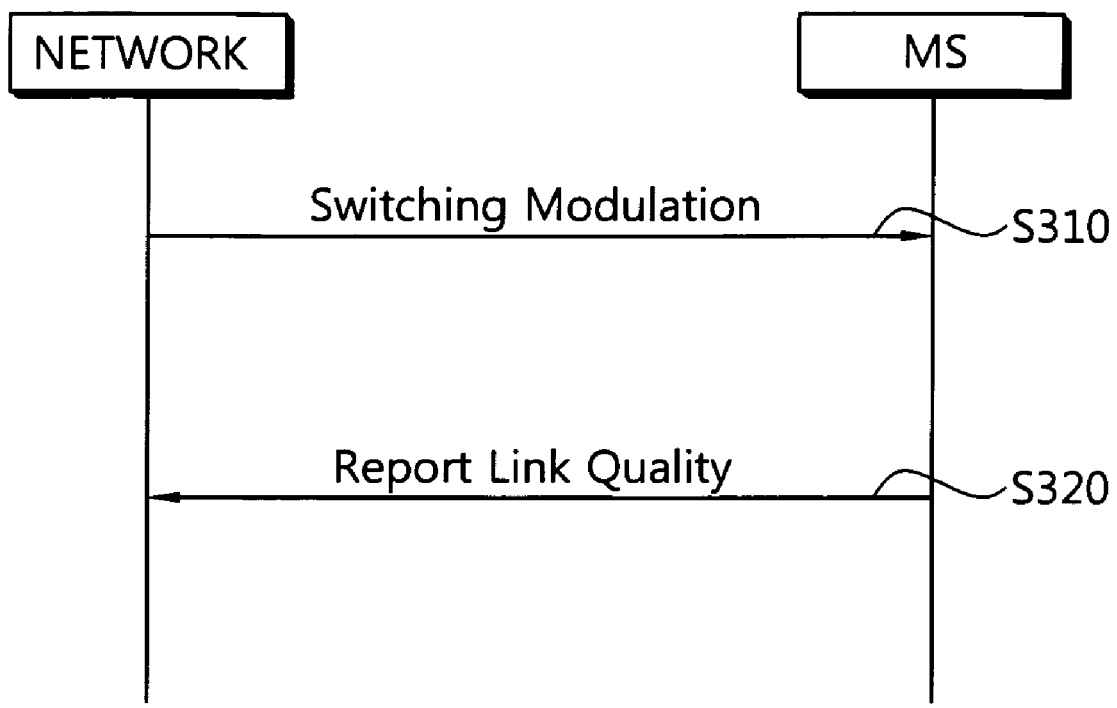

FIG. 5 is a flow diagram illustrating a method of reporting link quality according to another embodiment of the present invention.

Referring to FIG. 5, in a step S310, a BS transmits a control message to an MS. The control message includes a specific signalling 'SWITCHING_MODULATION' field for switching a configuration of a 'REPORTED_MODULATION' field. For example, when a packet downlink assignment message is used as the control message, the message can be configured as shown in Table 17 below.

TABLE 17

< Packet Downlink Assignment message content > ::=
...
   { 0 | 1 < EGPRS Window Size : < EGPRS Window Size IE >>
      < LINK_QUALITY_MEASUREMENT_MODE : bit (2) >
      < SWITCHING_MODULATION : bit(1) >
      < EGPRS2_LINK_QUALITY_MEASUREMENT_MODE :

TABLE 17-continued

```
      bit (1) >
      { 0 | 1 < BEP_PERIOD2 : bit(4) > } }
...
```

As shown in Table 18 below, the 'SWITCHING_MODULATION' field may be included as a part of the 'BEP_MEASUREMENTS' struct of the 'EGPRS Timeslot Link Quality Measurements Type 2'IE.

TABLE 18

```
<EGPRS Timeslot Link Quality Measurements Type 2 IE> ::=
{ 0 | 1 < BEP_MEASUREMENTS : BEP Measurement Report Struct >}
{ 0 | 1 < INTERFERENCE_MEASUREMENTS : Interference Measurement Report Struct >};
< BEP Measurement Report Struct > ::=
    < SWITCHING_MODULATION : bit(1) >
    { 0 | 1 < REPORTED_MODULATION : bit (2) >   <MEAN_BEP_TN0 : bit (4) > }
    { 0 | 1 < REPORTED_MODULATION : bit (2) >   <MEAN_BEP_TN1 : bit (4) > }
    { 0 | 1 < REPORTED_MODULATION : bit (2) >   <MEAN_BEP_TN2 : bit (4) > }
    { 0 | 1 < REPORTED_MODULATION : bit (2) >   <MEAN_BEP_TN3 : bit (4) > }
    { 0 | 1 < REPORTED_MODULATION : bit (2) >   <MEAN_BEP_TN4 : bit (4) > }
    { 0 | 1 < REPORTED_MODULATION : bit (2) >   <MEAN_BEP_TN5 : bit (4) > }
    { 0 | 1 < REPORTED_MODULATION : bit (2) >   <MEAN_BEP_TN6 : bit (4) > }
    { 0 | 1 < REPORTED_MODULATION : bit (2) >   <MEAN_BEP_TN7 : bit (4) > };
< Interference Measurement Report Struct > ::=
    { 0 | 1 < I_LEVEL_TN0 : bit (4) > }
    { 0 | 1 < I_LEVEL_TN1 : bit (4) > }
    { 0 | 1 < I_LEVEL_TN2 : bit (4) > }
    { 0 | 1 < I_LEVEL_TN3 : bit (4) > }
    { 0 | 1 < I_LEVEL_TN4 : bit (4) > }
    { 0 | 1 < I_LEVEL_TN5 : bit (4) > }
    { 0 | 1 < I_LEVEL_TN6 : bit (4) > }
    { 0 | 1 < I_LEVEL_TN7 : bit (4) > };
```

According to the value of the 'SWITCHING_MODULATION' field, the configuration of the 'REPORTED_MODULATION' field can be switched. For example, when the 'SWITCHING_MODULATION' field consists of one bit, if the value of this field is '0', the 'REPORTED MODULATION' field of Table 14 can be used, and if the value of this field is '1.', the 'REPORTED_MODULATION' field of Table 15 can be used. Alternatively, when the 'SWITCHING_ MODULATION' consists of two bits, if the value of the field is '00', the 'REPORTED_MODULATION' field of Table 14 can be used, if the value of the field is '01', the 'REPORTED_MODULATION' field of Table. 15 can be used, and if the value of the field is '10', the 'REPORTED_MODULATION' field of Table 16 can be used.

In a step S320, by using the 'REPORTED_MODULATION' indicated using the 'SWITCHING_MODULATION' field, the MS selects a modulation scheme which is the most used in a specific timeslot included in all assigned timeslots by radio blocks received since the last report, and reports the selected modulation scheme and link quality for the selected modulation scheme.

Now, a method of assigning radio resources for an uplink packet transmission in an EGPRS/EGPRS2 system will be described.

In order to establish an uplink TBF, an MS transmits to a network a packet channel request message through a packet random access channel (PRACH) or a random access channel (RACH). There are two types (i.e., one-phase access and two-phase access) of operations in uplink TBF establishment.

The one-phase access is supported only when a radio link control (RLC) mode is an acknowledge mode. Since a multi-slot class is also transmitted when the uplink TBF is requested by the MS, uplink TBF assignment can be achieved without any additional message between the MS and a network. This means that a multi-slot assignment is possible starting from an initial stage according to the configuration of the MS because the network knows the multi-slot class of the MS which has requested the uplink TBF. However, a contention may occur in some cases. When a plurality of MSs transmits (EGPRS/EGPRS2) packet channel request messages through the same PRACH or RACH, even if TBFs are not assigned to the MSs, the MSs may perform uplink transmission by considering that the TBFs are assigned, which results in the contention. To resolve the contention, the MS transmits a temporary logical link identifier (TLLI) by appending it to a subsequent RLC data block through the PDTCH. The TLLI is an MS identifier. If a packet uplink acknowledgment (ACK)/negative-acknowledgement (NACK) message received from the network includes the same TLLI, the MS determines that the resolution of the contention is completed. Thus, in the subsequent PDTCH, data is transmitted without appending the TLLI. If the received TLLI is different from the TLLI transmitted by the MS, the resolution of the contention is determined as a failure, and thus a TBF release operation is performed.

Figure 6:
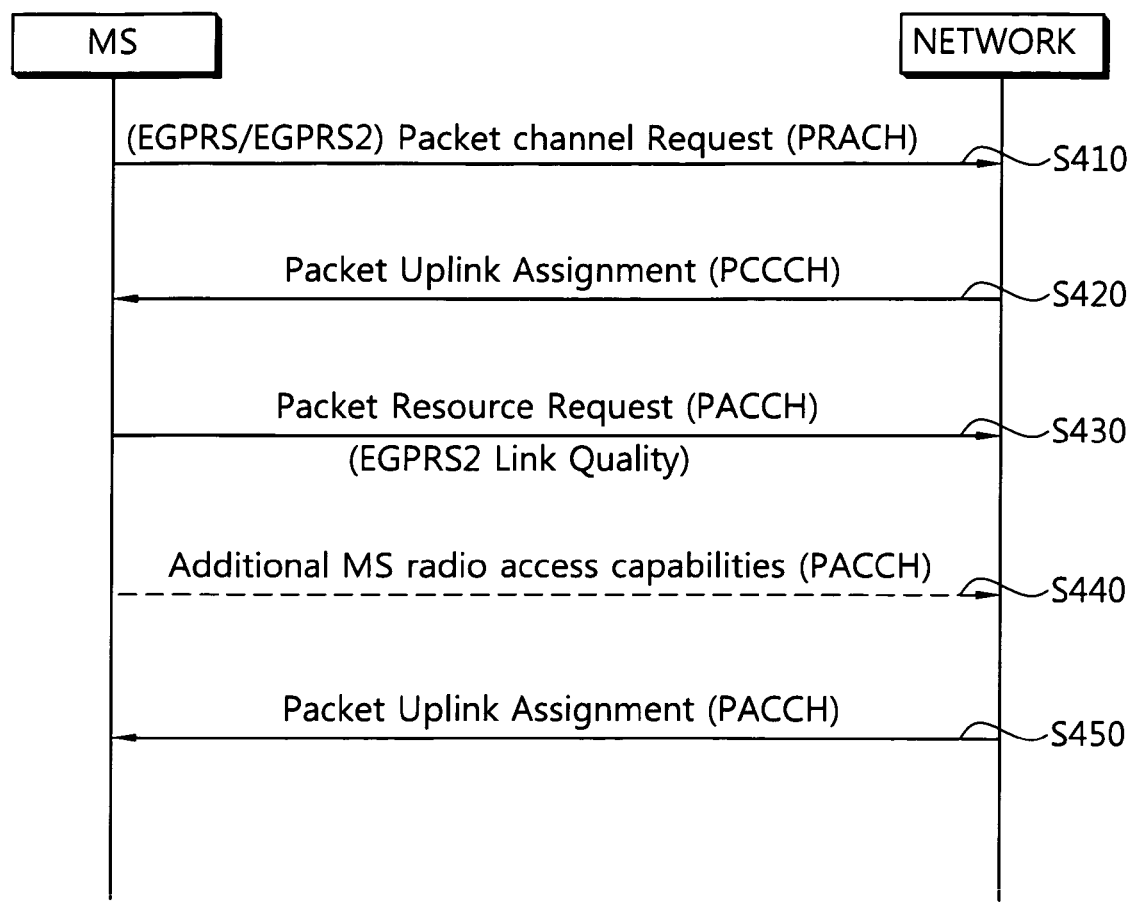
FIGS. 6 and 7 are flow diagrams illustrating a method of requesting uplink radio resources according to two embodiments of the present invention.

FIG. 6 is a flow diagram showing a method of requesting uplink radio resources according to an embodiment of the present invention.

Referring to FIG. 6, in a step S410, an MS transmits an (EGPRS/EGPRS2) packet channel request message to a network through a PRACH or a RACH in order to establish an uplink TBF. The (EGPRS/EGPRS2) packet channel request message includes an access type indicating either one-phase access or two-phase access and a parameter required to specify radio resources. The packet channel request message is transmitted through the PRACH or the RACH using an access burst. This may be found in clause 11.2.5 of 3GPP TS 44.060 V7.8.0 (2007-03) "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)". The EGPRS packet channel request message may be found in clause 11.2.5a of 3GPP TS 44.060 V7.8.0 (2007-03).

In a step S420, if the (EGPRS/EGPRS2) packet channel request message indicates a two-phase access request, the network transmits a packet uplink assignment message on a packet common control channel (PCCCH) in order to assign a single radio block on an uplink PDCH. If the packet channel request message indicates the two-phase access, the network can assign multi-blocks on the uplink PDCH.

In a step S430, upon receiving the packet uplink assignment message, the MS transmits a packet resource request message in a radio block assigned using the packet uplink assignment message. The packet resource request message is a message transmitted on a packet associated control channel (PACCH) in order to request a change of the assigned uplink radio resource. The packet resource request message includes an EGPRS2 link quality and a channel request description for uplink radio resource assignment. That is, a link quality for modulation schemes additionally supported in the EGPRS2 is included in the packet resource request message. Content of the packet resource request message will be described below.

When the packet resource request message is transmitted, the MS starts a resource request timer. The resource request timer is for evaluating a success or failure of a packet access procedure. The resource request timer operates for each TBF. Conditions of starting, stopping, and action at expiry of the resource request timer is shown in Table 19 below.

TABLE 19

| | Resource Request Timer |
|---|---|
| started | At sending the PACKET RESOURCE REQUEST message. A separate instance of the resource request timer is started for each TBF for which resources were requested. |
| stopped | On receipt of a PACKET UPLINK ASSIGNMENT, MULTIPLE TBF UPLINK ASSIGNMENT, PACKET TIMESLOT RECONFIGURE or a MULTIPLE TBF TIMESLOT RECONFIGURE message that assigns resources to an uplink TBF. On receipt of a PACKET ACCESS REJECT message that rejects one or more uplink TBFs. |
| action at expiry | Reinitiate the packet access procedure or retransmit the PACKET RESOURCE REQUEST message. |

In a step S440, as indicated in the dotted line in FIG. 6, if the MS desires to transmit additional information regarding radio access capability, the MS can transmit an additional MS radio access capability message together with an indication of an 'ADDITIONAL MS RAC INFORMATION AVAILABLE' field included in the packet resource request message.

In a step S450, in response to the packet resource request message, the network transmits the packet uplink assignment message and thus reports the assigned radio resources to the MS. The network transmits the packet uplink assignment message including a TLLI of the MS on the PACCH by using the access capability of the MS. The MS determines a success or failure of a contention resolution by evaluating the TLLI included in the packet uplink assignment message.

Alternatively, instead of transmitting the packet uplink assignment message, if the packet access of the MS is rejected, the network may transmit a packet access reject message. Upon receiving the packet access reject message, the MS stops the resource request timer and reports a packet access failure to an upper layer.

Now, a packet resource request message including information regarding the EGPRS2 link quality will be described. Link quality for modulation schemes additionally supported in EGPRS2 is transmitted using the packet resource request message.

Table 20 below shows an example of an information element (IE) included in the packet resource request message for the report of the EGPRS2 link quality.

TABLE 20

```
< Packet Resource Request message content > ::=
 { 0 | 1 < ACCESS_TYPE : bit (2) > }
 { 0    < Global TFI : < Global TFI IE > >
 | 1    < TLLI / G-RNTI : < TLLI / G-RNTI IE > > }
 < Channel Request Description : < Channel Request Description IE > >
 < ADDITIONAL MS RAC INFORMATION AVAILABLE : bit (1) >
 ...
 { 0 | 1 < EGPRS BEP Link Quality Measurements Type 2 :
          < EGPRS BEP Link Quality Measurements Type 2 IE>>}
 { 0 | 1 < EGPRS Timeslot Link Quality Measurements Type 2 :
          <EGPRS Timeslot Link Quality Measurements Type 2 IE >>}
 ...
```

The 'ACCESS_TYPE' field includes a reason of access request. For example, this field may specify a one or a two-phase access request, a page response, a cell update, and a mobility management procedure.

The 'Global TFI' field includes a TFI for the uplink TBF of the MS. A temporary logical link identity (TLLI) is in association with a GPRS subscriber, and is defined in 3GPP TS 23.003. A G-RNTI is defined in 3GPP TS 44.160.

The 'Channel Request Description' IE describes information necessary to request uplink radio resources. This IE includes information regarding a radio priority of the requested TBF, an RLC mode of the requested TBF, an amount of an RLC data block to be transmitted by the MS, etc.

The 'ADDITIONAL MS RAC INFORMATION AVAILABLE' field indicates whether to transmit additional information regarding radio access capability of the MS.

Figure 7:
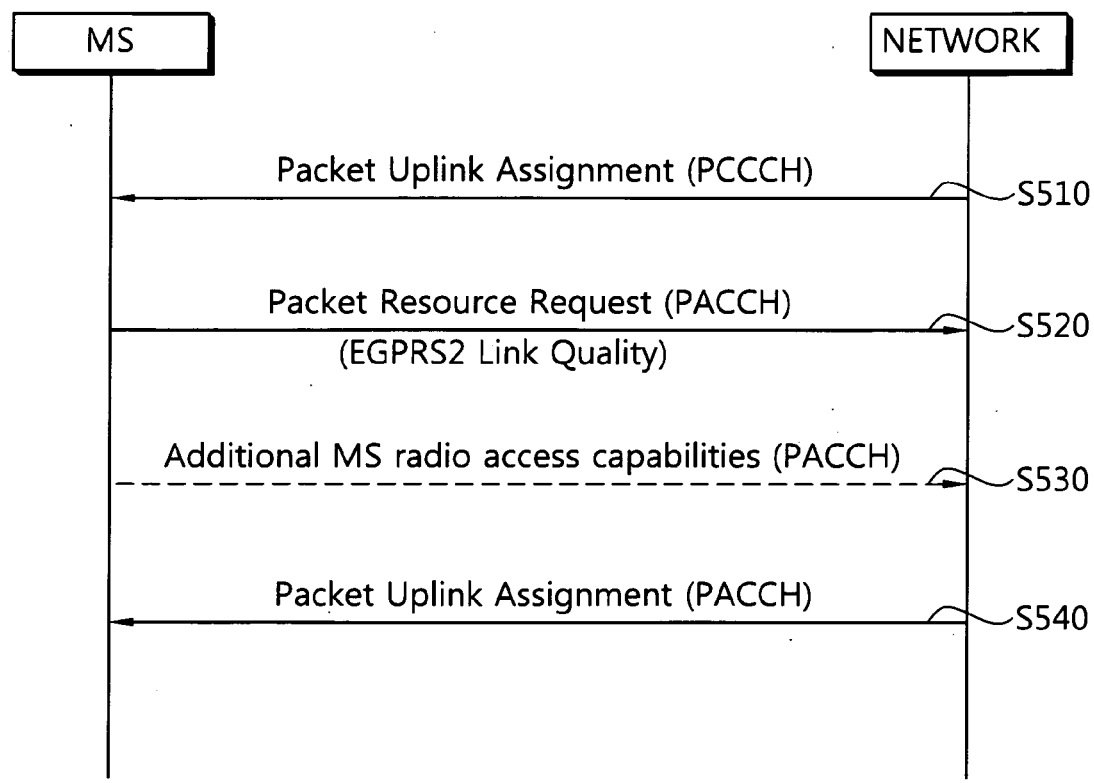

FIG. 7 is a flow diagram showing a method of requesting uplink radio resources according to another embodiment of the present invention.

This embodiment differs from the embodiment described with reference to FIG. 6 in that it is initiated by the network directly.

Referring to FIG. 7, in a step S510, a network transmits a packet uplink assignment message to an MS on a PCCCH in order to instruct transmission of a packet resource request message.

In a step S520, upon receiving the packet uplink assignment message, the MS transmits the packet resource request message in a radio block assigned using the packet uplink assignment message on a PACCH. The packet resource request message includes an EGPRS2 link quality and a channel request description for uplink radio resource assignment. Additional details have been described previously with reference to step S430.

When the packet resource request message is transmitted, the MS starts a resource request timer.

The method then comprises a step S530 performed in a manner similar with step S440.

The method further comprises a step S540 performed in a manner similar with step S450.

In other words, when a mobile station requests EGPRS2 resources by PACKET RESOURCE REQUEST message, the information on the link quality measurements is sent if the related IEs are available and if those IEs would not cause the message to expand beyond one RLC/MAC control block.

The IEs and tables described above are for exemplary purposes only, and thus names of fields included in each IE, the number of bits of each field, and arrangement of the fields can be modified.

According to the present invention, a mobile station can report link quality for modulation and coding schemes additionally provided in an enhanced general packet radio service phase 2 (EGPRS2) system. Therefore, the performance of a link adaptation process can be improved.

Furthermore, link quality is reported not for all but for some modulation schemes. Therefore, a signalling overhead is reduced, and performance deterioration is minimized in a link adaptation process. In addition, even in a case where there is a plurality of different modulation schemes with the same number of received radio blocks, an overall system performance can be increased by defining a modulation scheme whose link quality is to be reported.

Mobile stations can also transmit to a network a link quality for modulation schemes additionally supported in an enhanced general packet radio service phase 2 (EGPRS2) system, so that the network can effectively assign the uplink radio resources to each mobile station. Therefore, performance of uplink transmission can be improved.

The present invention can be implemented with hardware, software, or combination thereof. Regarding hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. Regarding software implementation, the present invention can be implemented with a module for performing the aforementioned functions. Software is storable in a memory unit and executed by a processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of reporting link quality for radio blocks using a plurality of modulation schemes, wherein the method comprises, performed in a mobile terminal:

determining a link quality parameter for each modulation scheme and each timeslot assigned to the mobile terminal;

determining the number of times each modulation scheme is used in each of the assigned timeslots over a reporting period;

selecting a modulation scheme per timeslot; and reporting to a network, for each assigned timeslot, the selected modulation scheme and the link quality parameter corresponding to the selected modulation scheme, wherein the selected modulation scheme is the modulation scheme with which the mobile terminal has received the largest number of radio blocks per timeslot over the reporting period.

2. The method of claim 1, wherein determining the link quality parameter comprises:

measuring a bit error probability (BEP) per burst;

averaging the measured BEP per radio block; and computing the link quality parameter based on the measured and averaged BEP per modulation scheme and per time slot.

3. The method of claim 1, wherein the plurality of modulation schemes comprises Gaussian minimum shift keying (GMSK), quadrature phase shift keying (QPSK), 8-phase shift keying (PSK), 16-quadrature amplitude modulation (QAM), and 32-QAM.

4. The method of claim 1, wherein the plurality of modulation schemes comprises GMSK, QPSK, 8-PSK, 16-QAM normal symbol rate (NSR), 16-QAM higher symbol rate (HSR), 32-QAM NSR, and 32-QAM HSR.

5. A mobile terminal comprising a radio frequency (RF) unit adapted to receive radio blocks using a plurality of modulation schemes and a processor coupled with the RF unit and adapted for:

determining a link quality parameter for each modulation scheme and each timeslot assigned to the mobile terminal;

determining the number of times each modulation scheme is used in each of the assigned timeslots over a reporting period;

selecting a modulation scheme per timeslot; and reporting to a network, for each assigned timeslot, the selected modulation scheme and the link quality parameter corresponding to the selected modulation scheme, wherein the processor is adapted for selecting the modulation scheme which is the modulation scheme with which the mobile terminal has received the largest number of radio blocks per timeslot over the reporting period.

6. The mobile terminal of claim 5, wherein the processor is adapted for determining the link quality parameter by:

measuring a bit error probability (BEP) per burst;

averaging the measured BEP per radio block; and computing the link quality parameter based on the measured and averaged BEP per modulation scheme and per time slot.

* * * * *